F. MATOUSHEK.
MOTOR CULTIVATOR.
APPLICATION FILED NOV. 8, 1915.
1,210,511.
Patented Jan. 2, 1917.
3 SHEETS—SHEET 1.
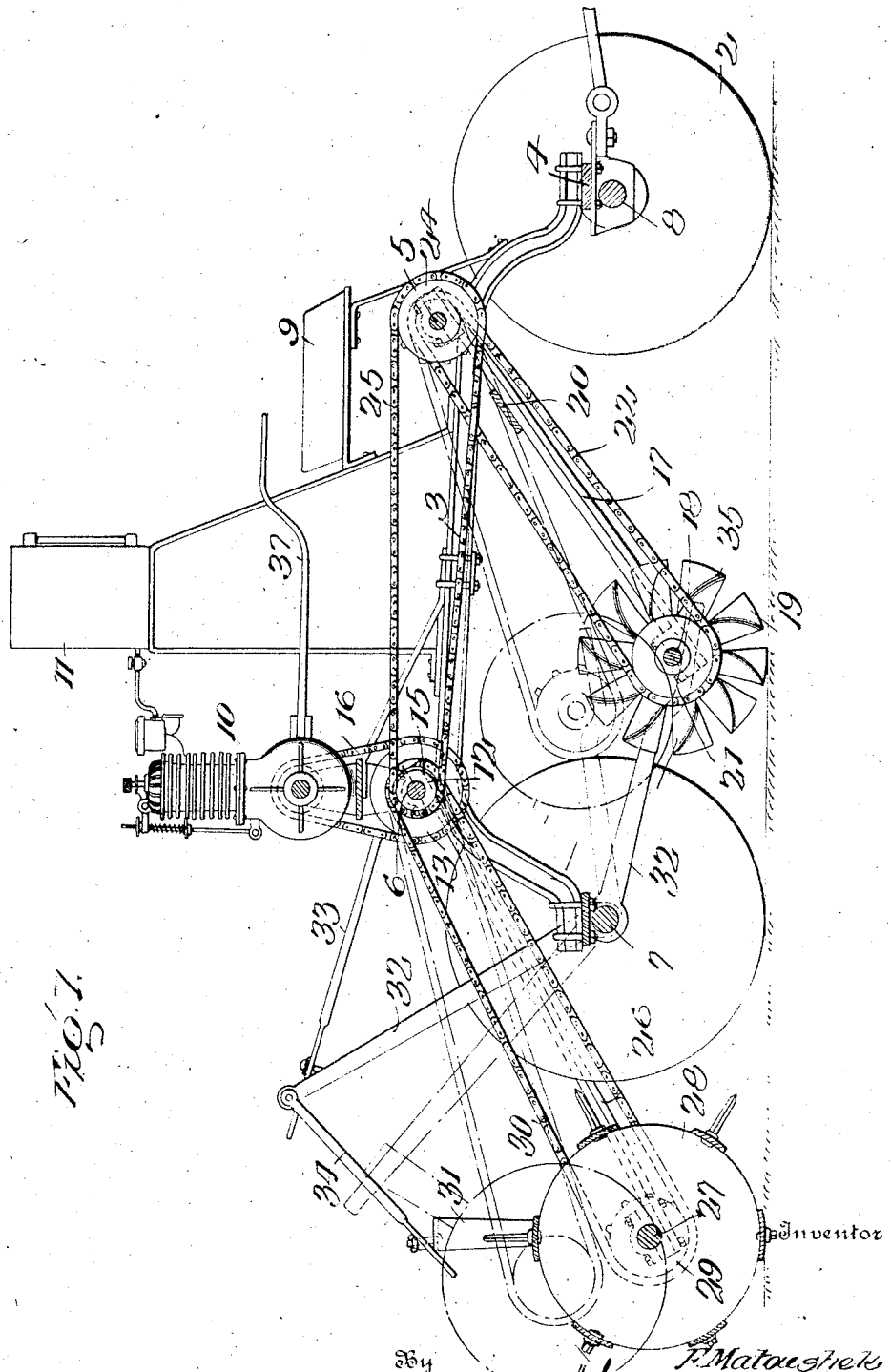
Inventor
F. Matoushek
By
Attorneys

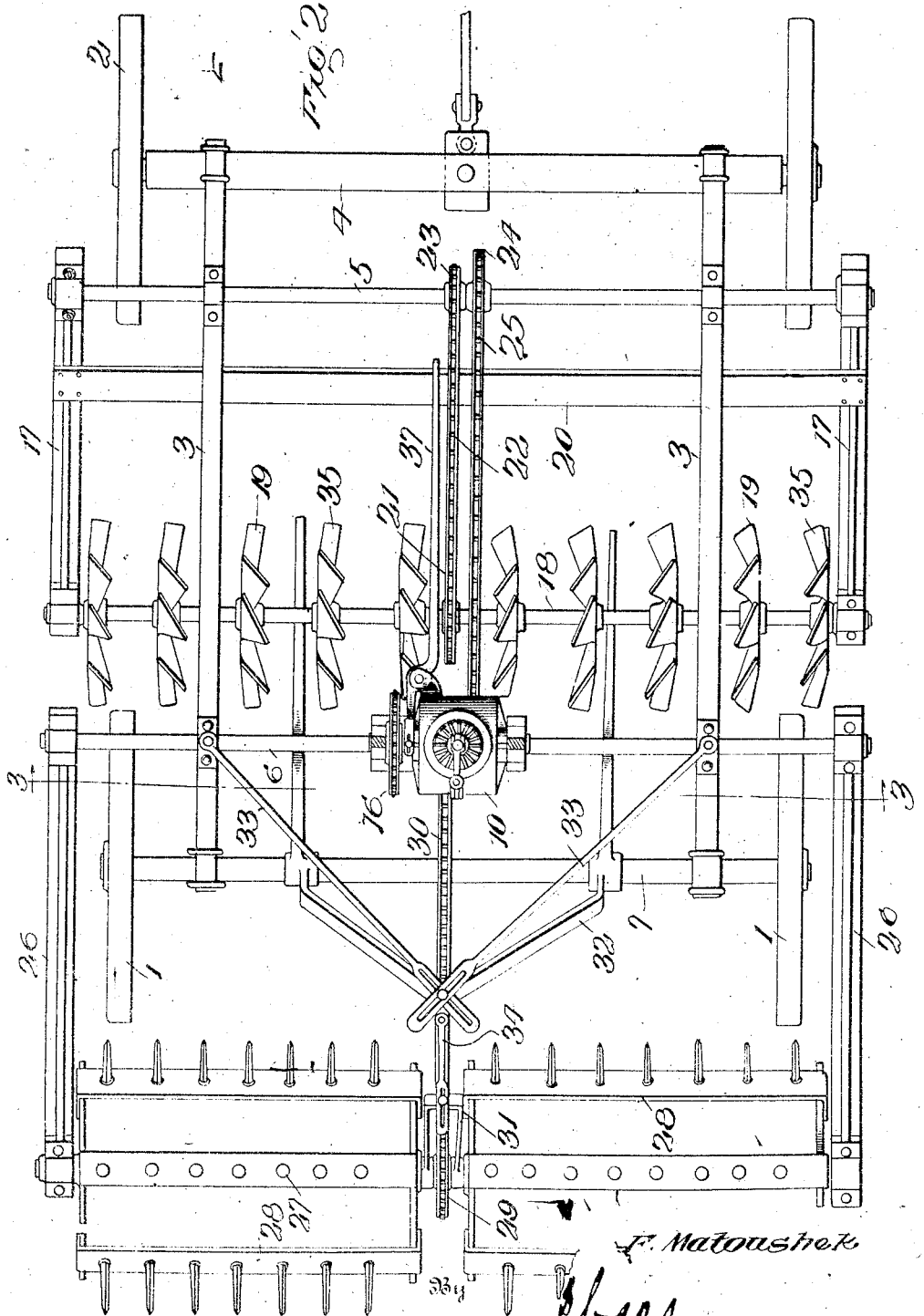

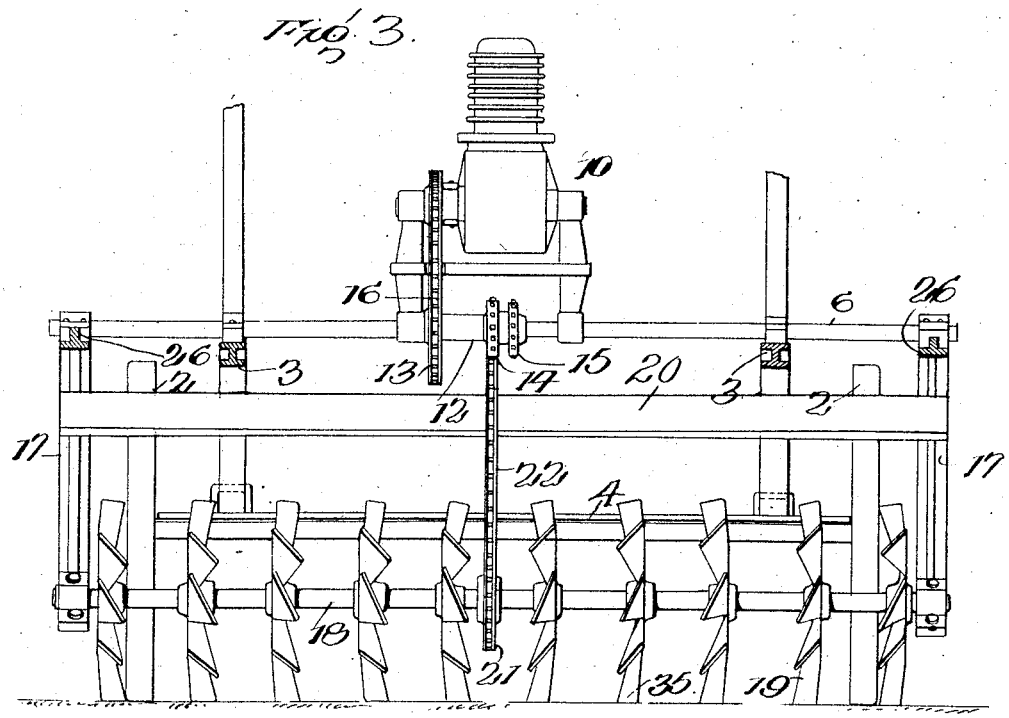
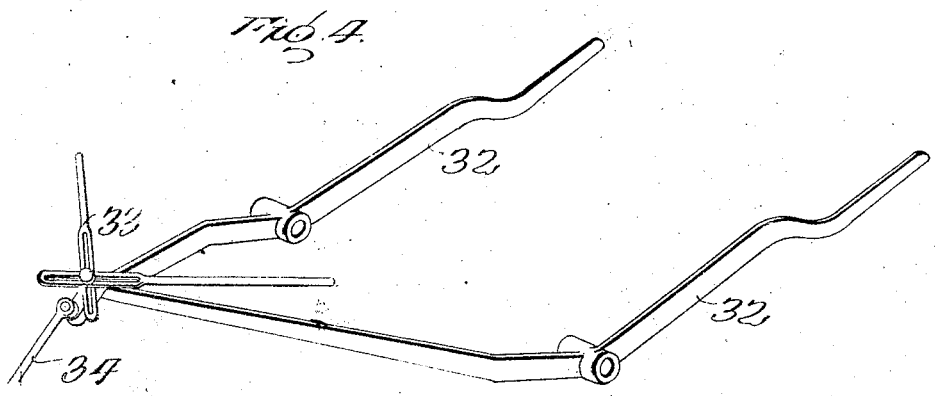

UNITED STATES PATENT OFFICE.

FRANK MATOUSHEK, OF COLOME, SOUTH DAKOTA.

MOTOR-CULTIVATOR.

1,210,511.  Specification of Letters Patent.  Patented Jan. 2, 1917.

Application filed November 8, 1915. Serial No. 60,310.

*To all whom it may concern:*

Be it known that I, FRANK MATOUSHEK, a citizen of the United States, residing at Colome, in the county of Tripp and State of South Dakota, have invented certain new and useful Improvements in Motor-Cultivators, of which the following is a specification.

The invention appertains to agricultural implements and more particularly to the type designed for treating the soil preliminary to planting.

The invention provides an implement which is adapted to be drawn over the field by horse power and which embodies a motor, such as an explosive engine, for driving the working parts.

The invention contemplates a novel structure and arrangement of parts, whereby the earth treating devices may be elevated so as to clear the ground when transporting the implement from place to place, the devices being so arranged as to mutually counter-balance.

With these and other objects in view, which will readily appear as the nature of the invention is better understood, the same consists in the improved construction and novel arrangement and combination of parts which will be hereinafter fully described and particularly claimed.

In the accompanying drawings has been illustrated a simple and preferred form of the invention, it being, however, understood that no limitation is necessarily made to the precise structural details therein exhibited, but that changes, alterations and modifications within the scope of the invention as claimed may be resorted to when desired.

Referring to the drawings—Figure 1 is a side view, partly in section, of an agricultural implement embodying the invention; Fig. 2 is a top plan view of the implement; Fig. 3 is a transverse section on the line 3—3 of Fig. 2, looking to the right, as indicated by the arrows; Fig. 4 is a detail view of the lifter.

Corresponding and like parts are referred to in the following description and indicated in all the views of the drawings by the same reference characters.

The implement comprises a truck which is adapted to be drawn over the field by horse power, such truck supporting the earth treating devices and the engine by means of which the earth treating devices are operated. It is to be understood that the engine performs no work in the propelling of the implement but is utilized simply for operating the working parts which act directly upon the soil. The draft employed for drawing the implement over the field does not perform any work in driving the operating parts. The engine and the team operate independently although working at the same time and the speed of the engine is regulated to suit the speed at which the implement moves over the field.

The truck embodies a frame of suitable structure which is mounted upon rear wheels 1 and front wheels 2. As shown the frame embodies longitudinal bars 3 and cross bars 4, 5 and 6. The several frame bars are rigidly connected at their points of crossing so as to form a substantial frame-work. As indicated most clearly in Fig. 1 the front and the rear ends of the longitudinal bars 3 curve downwardly. An axle 7 connects the lower rear ends of the longitudinal bars 3 whereas the lower forward ends of the bars 3 are connected by means of the cross bar 4 to which the front axle 8 is connected in any manner so as to swing to admit of proper steering. The draft for drawing the implement over the field is applied to the front axle 8 in any preferred manner. The driver's seat 9 is mounted upon the main frame.

The numeral 10 designates a motor which is preferably of the explosive type, such as a gasolene engine. The fuel, such as gasolene, is supplied to the motor from a tank 11 which is conveniently supported upon the main frame at such an elevation as to supply the fuel by gravitative action. A sleeve 12 is mounted upon the rod 6 and has sprocket gears 13, 14 and 15 secured thereto. The sleeve 12 is adapted to be driven from the engine by means of a sprocket chain 16 which passes around the sprocket wheel 13. Power is taken from the sprocket wheels 14 and 15 for operating the earth treating devices to be driven.

Bars 17 are pivotally mounted upon the ends of the rod 5 and incline rearwardly and downwardly and support a shaft 18 which is provided with a plurality of cutting disks 19. A cross bar 20 connects the bars 17 and forms therewith a swinging frame which carries the cutting disks or other earth treating devices. A sprocket wheel 21 is secured to the shaft 18 and a sprocket chain 22 connects the sprocket wheel 21 with a sprocket wheel 23 mounted upon the bar 5. By this means power is transmitted from a sprocket wheel 24 mounted upon the bar 5 to the shaft 18. The sprocket wheels 23 and 24 are connected or formed in any manner so as to rotate as one part and are mounted loosely upon the bar 5. A sprocket chain 25 connects the sprocket wheel 24 with the sprocket wheel 15 on the bar 6. Other bars 26 are pivotally mounted upon the ends of the cross bar 6 and incline rearwardly and downwardly and support a shaft 27 at their lower rear ends. Toothed drums 28 are secured to the shaft 27 so as to rotate therewith, the purpose of such drums being to pulverize and level. It is to be understood that any form of earth treating devices may be secured to the shaft 27 to rotate therewith. A sprocket wheel 29 secured to the shaft 27 is connected by means of a sprocket chain 30 to the sprocket wheel 14. By this means the shaft 27 and earth treating devices attached thereto receive a rotary movement. A loop or U-shaped connection 31 is loosely mounted upon the shaft 27 and its members embrace the sprocket wheel 29 and sprocket chain 30. The purpose of this loop or connection 31 is to support the earth treating devices 28 clear of the ground when it is required to throw the same out of action as when moving the implement from place to place.

A lifter 32 is pivotally mounted upon the axle 7 and comprises transversely spaced arms which are curved at their forward ends and extended so as to engage under the shaft 18. The rear portion of the lifter 32 extends upwardly and rearwardly and comprises converged arms or members. When the upper rear end of the lifter 32 is depressed the forward end of the arms of the lifter is elevated and raises the shaft 18 and earth treating devices mounted thereon. The upper rear end of the lifter 32 is held depressed by engaging the upper end of the loop 31 thereover, this being effected by raising the shaft 27 a distance and swinging the upper portion of the loop 31 over the upper rear end of the lifter 32. The earth treating devices 28 and 19 about counterbalance and both are held elevated in the manner indicated by the dotted lines in Fig. 1. When the earth treating devices are raised the implement may be moved over a road or field without endangering the earth treating devices which are held sufficiently elevated to avoid contact with the surface. Any suitable means may be provided for holding the lifter and loop 31 in a given position. As indicated, rods 33 are attached at their forward ends to the main frame, and their rear ends have adjustable connection with the upper rear portion of the lifter 32. A rod 34 constitutes an adjustable connection between the upper rear end of the lifter 32 and the loop 31. The cutting disks 19 are of like formation, each being formed with a plurality of radial slits and having the portions comprised between such slits twisted slightly to form blades 35. The edges or outer ends of the blades 35 come in contact with the soil in a diagonal direction, thereby serving to cut through roots, clods or other material.

An implement embodying the invention is transported and moved over the field when in operation by means of a team of horses or like animal draft power. The power for operating the various earth treating devices is derived solely from the engine 10. It will thus be understood that the draft for drawing the machines over the field may be comparatively light because no part of such draft is utilized for any purpose other than drawing the machine over the field. The engine is adjusted to the speed of the implement so as to effectively perform the work. A lever 37 is provided for throwing the engine into or out of gear and such lever extends within convenient reach of the driver's seat 9. The lifter and parts coöperating therewith may, of course, be adjusted to regulate the depth to which the earth-treating devices may penetrate the soil. As the said devices are positively driven by the motor, they do not act as a drag on the draft animals and may be of any desired width and, if very wide, may be made in sections connected by universal or hinge joints so as to conform to irregular ground surfaces.

Having thus described the invention, what is claimed as new is:—

1. An agricultural implement comprising a truck, independent front and rear earth-treating devices suspended from the truck, a motor mounted upon the truck, operative connections between the motor and the earth-treating devices, and a lifter pivotally supported on the truck between the front and rear earth-treating devices and adapted to be operatively connected therewith whereby to hold both said devices elevated and be balanced by them.

2. In an implement of the character specified, the combination of a truck, frames connected with the truck and provided with earth-treating devices and adapted to be moved to effect a raising or a lowering of the earth-treating devices, a lifter pivotally mounted upon the frame and adapted to engage one of the frames to hold the same elevated, and connecting means between such lifter and the other one of the frames whereby the frames mutually counter-balance to hold one another in raised position with the earth-treating devices clear of the ground.

3. An implement of the character specified, a truck, a pivoted frame provided with earth-treating devices, a pivoted lifter adapted to engage the said frame, a second pivoted frame provided with earth-treating devices, and a connection attached to the second frame and adapted to engage the lifter for holding both frames in raised position with the earth-treating devices clear of the ground.

4. In an implement of the character described, a main frame, two pivoted frames provided with earth-treating devices, a lifter pivoted upon the main frame and adapted to engage one of the pivoted frames, adjustable connecting means between the lifter and main frame, connecting means carried by the other pivoted frame for engaging the lifter to hold both pivoted frames in raised position, and adjustable means connecting the lifter with the connection of the second pivoted frame.

In testimony whereof, I affix my signature.

FRANK MATOUSHEK. [L. S.]